United States Patent
Beaudry

(10) Patent No.: US 8,096,876 B2
(45) Date of Patent: Jan. 17, 2012

(54) THREE DIMENSIONAL SPORTS GAME

(76) Inventor: Donald M. Beaudry, Kingwood, TX (US)

( * ) Notice: Subject to any disclaimer, the term of this patent is extended or adjusted under 35 U.S.C. 154(b) by 709 days.

(21) Appl. No.: 11/242,331

(22) Filed: Oct. 3, 2005

(65) Prior Publication Data

US 2007/0077974 A1 Apr. 5, 2007

(51) Int. Cl.
*A63F 9/24* (2006.01)
(52) U.S. Cl. ............................................. 463/31; 463/1
(58) Field of Classification Search .......... 463/1, 30–34; 273/108, 108.1, 108.2, 245, 247
See application file for complete search history.

(56) References Cited

U.S. PATENT DOCUMENTS

| | | | | |
|---|---|---|---|---|
| 4,398,723 A | * | 8/1983 | Erickson et al. | 352/72 |
| 4,421,317 A | * | 12/1983 | Hector et al. | 463/32 |
| 5,421,589 A | * | 6/1995 | Monroe | 345/9 |
| 5,471,328 A | * | 11/1995 | Wreede | 359/22 |
| 6,061,656 A | * | 5/2000 | Pace | 705/1 |
| 6,206,748 B1 | * | 3/2001 | Kauth | 446/219 |

OTHER PUBLICATIONS

EA Sports Madden 2005 game manual.*
Gale Group Globalbase—"Sega Enterprises Offers Holographic Video Game".*

* cited by examiner

*Primary Examiner* — David L Lewis
*Assistant Examiner* — Eric M Thomas
(74) *Attorney, Agent, or Firm* — Delphine James

(57) ABSTRACT

The present invention discloses a highly specialized gaming console. The gaming console comprises housing for supporting a field covering, a scoreboard, display means, holographic projecting camera, and user interface means. The software components of the present invention includes a means for initializing the game from an external media, selecting teams for playing the game, repetitively generating plays based upon the team statistics in conjunction with the offensive and defensive plays of the teams, and generating a holographic display of the generated play on the field. The game can be adapted to play baseball, football, and golf.

35 Claims, 15 Drawing Sheets

SELECT A GOLF PLAYER

TIGER WOODS

JOHN DOE 1

JOHN DOE 2

PLAYER 1 NEW YORK FALCONS

SELECT PLAYERS

JOHN DOE 1  BAT AVG DFS POSITION AVG

JOHN DOE 2  BAT AVG DFS POSITION AVG

JOHN DOE 3  BAT AVG DFS POSITION AVG

JOHN DOE N  BAT AVG DFS POSITION AVG

| IDENTIFICATION NO | PLAY | GRAPHICS |
|---|---|---|
| 1 | SHORT STOP | XXX.MPEG |
| 2 | FLY BALL | XXX.MPEG |
| 3 | FIRST BASE | XXX.MPEG |
| | | |

THREE DIMENSIONAL SPORTS GAME

BACKGROUND

Electronic games have been around since the 1970s when arcade video games were introduced to the general public. Nintendo further expanded the game market in 1989 by introducing the game boy hand-held system. Today computer games are very popular because computers brought a new flexibility. Since computers can store data, they made a good platform for video games.

In the early 1990s a drop in the CD-ROM technology led to a wave of multi-media games which combine audio, video, animation, photographs and other media. Then in 1995, Microsoft introduced an operating system with built-in drivers to support for sound cards, graphic cards, joysticks, and other controllers. Now, there is a wave new wave more interactive games known as virtual reality. The present invention integrates holograms to create a realistic game environment for the user.

BRIEF DESCRIPTION OF THE DRAWINGS

FIG. 4A illustrates an example of a player selection screen for golf.

FIG. 5 illustrates an example of a player 1 selection screen for baseball.

FIG. 7 Visual graphics display in memory

SUMMARY

One of the main objectives of the present invention is to allow each player to view a realistic holographic image of each play prior to adequately ascertain their next move in the game. The present invention discloses a highly specialized gaming console. The gaming console comprises housing for supporting a field covering, a scoreboard, display means, holographic projecting camera, and user interface means. The software components of the present invention includes a means for initializing the game from an external media, selecting teams for playing the game, repetitively generating plays based upon the team statistics in conjunction with the offensive and defensive plays of the teams, and generating a holographic display of the generated play on the field. The game can be adapted to play baseball, football, and golf. In this game each player manages the game based upon selected team players. The player is not an interactive member of the game.

DETAILED DESCRIPTION

Figure 1:
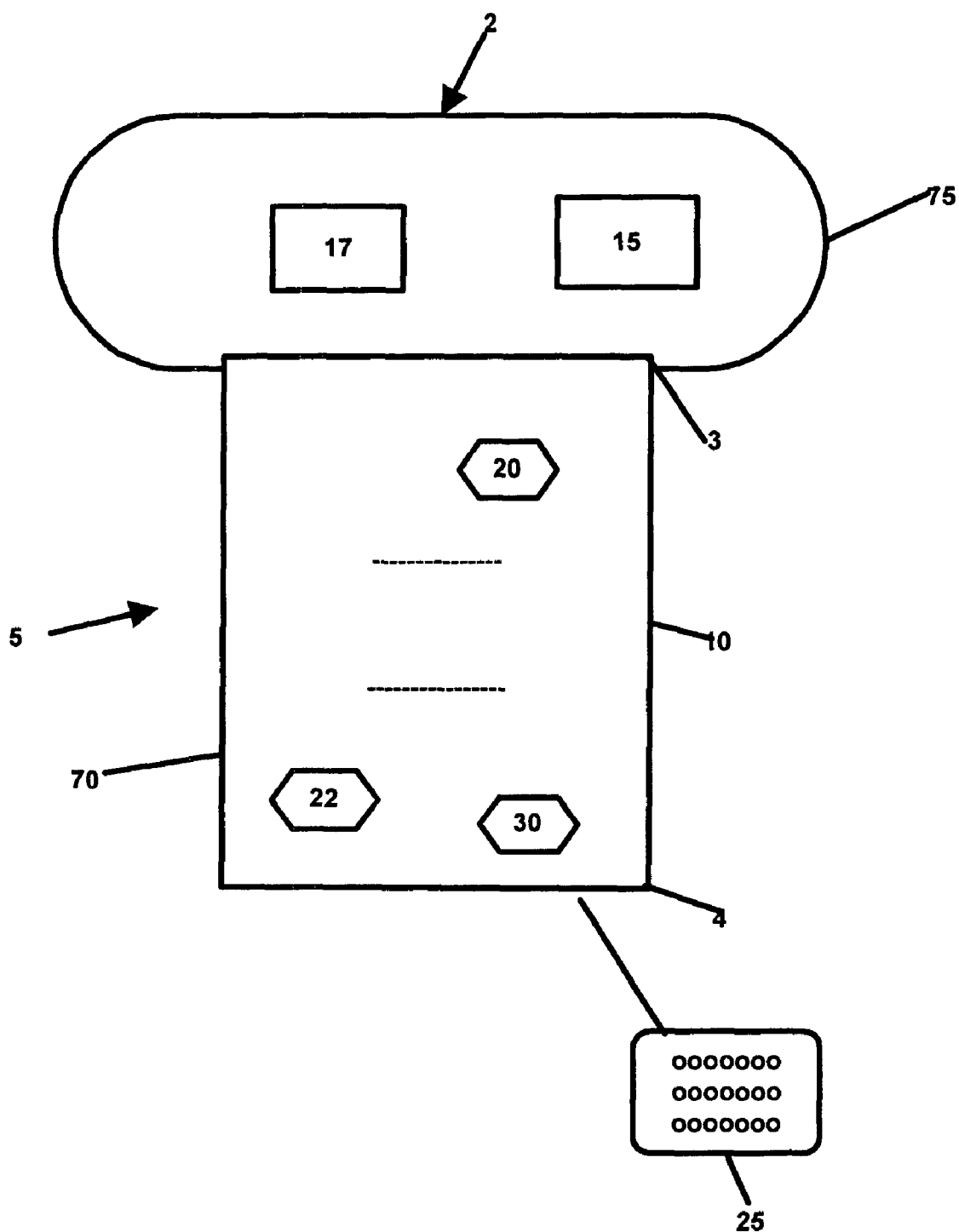
FIG. 1 illustrates a perspective view of the gaming console device the present invention.

FIG. 1 is a perspective view of the present invention, a field play gaming device 5. The gaming device 5 includes a housing (2) for supporting field covering 10, scoreboard 15, display means 17, and holographic projecting camera 20 and 22, user interface means 25 and electronic circuitry 30.

Housing 2 further comprises bottom portion 70 connected to back portion 75. In the preferred embodiment, bottom portion 70 can be a three dimensional rectangular opened or closed container. As depicted in FIG. 1 bottom portion 70 can be a closed container with field covering 10 overlaying flat top surface 72. In an alternative embodiment, bottom portion 70 can be an opened container with field covering 10 contained therein. Bottom portion 70 is further defined by a front edge 4 and back edge 3. Back portion 75 is perpendicularly adjoined to back edge 3. Housing 2 can also be supported by leg members. Housing 2 is not limited to a rectangular configuration, but is defined by the desired sports game.

Field covering 10 is removable and has physical indicia means constructed to represent each aspect of a real playing field of the sport, e.g. baseball, football, and golf and other sports supported by the game.

Scoreboard 15 and display means 17 are strategically mounted to the top surface of back portion 75. As illustrated scoreboard 15 and display means 17 can lye adjacent to each other. However, scoreboard 15 and display means 17 can lye above each other or in another suitable configuration. As shown, in one embodiment scoreboard and display means are angularly mounted to the top surface of back portion 75.

Score board 15 can be divided into two sections one for each current player. The game can either be in single player mode or two player mode. Score board 15 displays the current score for each player of the game.

Display means 17 is used to display required game decision information to a particular player. Display means 17 outputs onto the screen display the team selection information, the player selection information and the potential offensive and defensive moves to be taken during a game situation. Display means (17) and scoreboard (15) can be LED and/or LCD display devices. Holographic projecting camera 20 and 22 displays the resulting real-time play onto field 10 which is a replica of the game field thereby providing a real-time viewing of the actual game to the player.

User interface means (25) allows the user to communicate with the computer and can be a conventional keyboard in the preferred embodiment. However, touch screen input or voice activation or a combination thereof can also be utilized. The user interface means (25) is used by each player to select possible defensive and offensive moves displayed onto display means 17.

Figure 2:
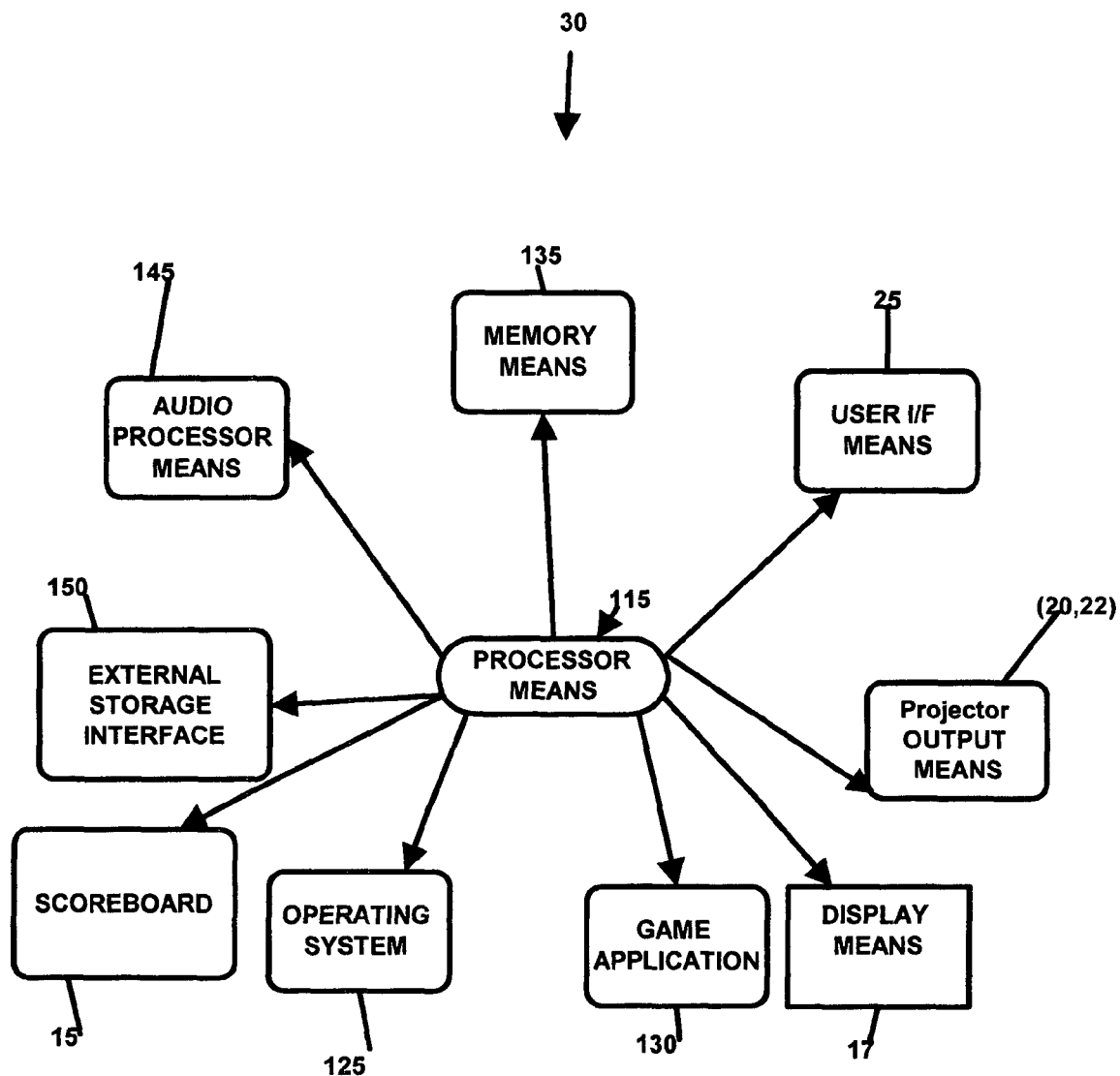
FIG. 2 illustrates the electronic circuitry to support the present invention.

Electronic circuitry 30 contains the computer components necessary to control the game. Referring to FIG. 2, there is shown a block diagram of the electronic circuitry components 30 contained within housing 2. The electronic circuitry components 30 further comprises a processor means (115) coupled to user interface means (25), operating system software (125), game application software (130), memory means (135), audio processor means (145) and external storage media interface (150).

Processor means (15) can be a conventional central processor unit (CPU) which performs the software instructions that control the computer. The CPU translates the software into computer instructions and executes the translated computer instructions. Processor means (15) locates the instruction in memory means (135), transfers the instruction into a special buffer known as a register, and then executes the instruction in the register. In some embodiments, the processor means (15) can be integrated into one combined circuit with the audio processing means (145), a conventional sound card.

Internal memory means (135) can be a conventional Random Access Memory (RAM) or read only memory (ROM). RAM and ROM are physical storage within the computer. RAM provides temporary storage for the game application software as they are executed by the CPU. RAM can be altered. However, ROM cannot be altered. Normally, ROM is used for boot up software such as operating system software (125) including device driver software.

The operating system software (125) controls the interface between the processor means (115), the memory means (135), game application software (130), holographic projecting camera (20, 22), user interface means (25), and external storage interface device means (150). Operating software means (125) instructs the game controller on how to boot up. Then the operating software means manages the interface between the operator and the user interface means (25). The system team statistics data (137), visual graphics (138), and the game software (130) are loaded data from the external storage means (150) into memory means (135). Additionally, the operating system software 125 support device drivers software to control the execution of peripheral devices including but not limited display means (17), holographic projecting cameras (20, 22) external storage interface (150), and scoreboard (15). External storage media can be magnetic storage (i.e. floppy disk), optical (i.e. CD), flash memory or another suitable external media storage type.

To set up the holographic images for the game each possible play for a desired game is filmed. For each play, then the filmed holographic image is created and stored on external storage media. Therefore, for each desired game (ie baseball, football, or golf) an image is created for each possible play. As shown in FIG. 7, a data structure can be created and stored in memory means 135 to support the location of each possible play for a desired game. The game software application would include a specialized module to interpret the stored visual data and display a holographic image of the desired play onto the field using the holographic projecting camera (20, 22). Based upon size the visual image, the partial images can be stored in memory means 135 and external storage media interface 150. The advantage of the holographic projecting image is that the user can make real time decisions based upon visual data instead of the current textual based systems.

In alternative embodiments the housing can be restructured into individual hardware components which can include a field component, a display component, a controller component and a user interface component. The controller component houses the processor means, external media interface, memory, and operating system software. The field component houses a physical replica of the field for the sports game (i.e. baseball, football, or golf). The display component houses the scoreboard and the output display. The user interface component houses the keyboard, touch pad, or another suitable interface means. Additionally, the user interface component can be integrated into the controller component. The controller component provides communication interface connections to the field component, the display component, and the user interface component.

Figure 3:
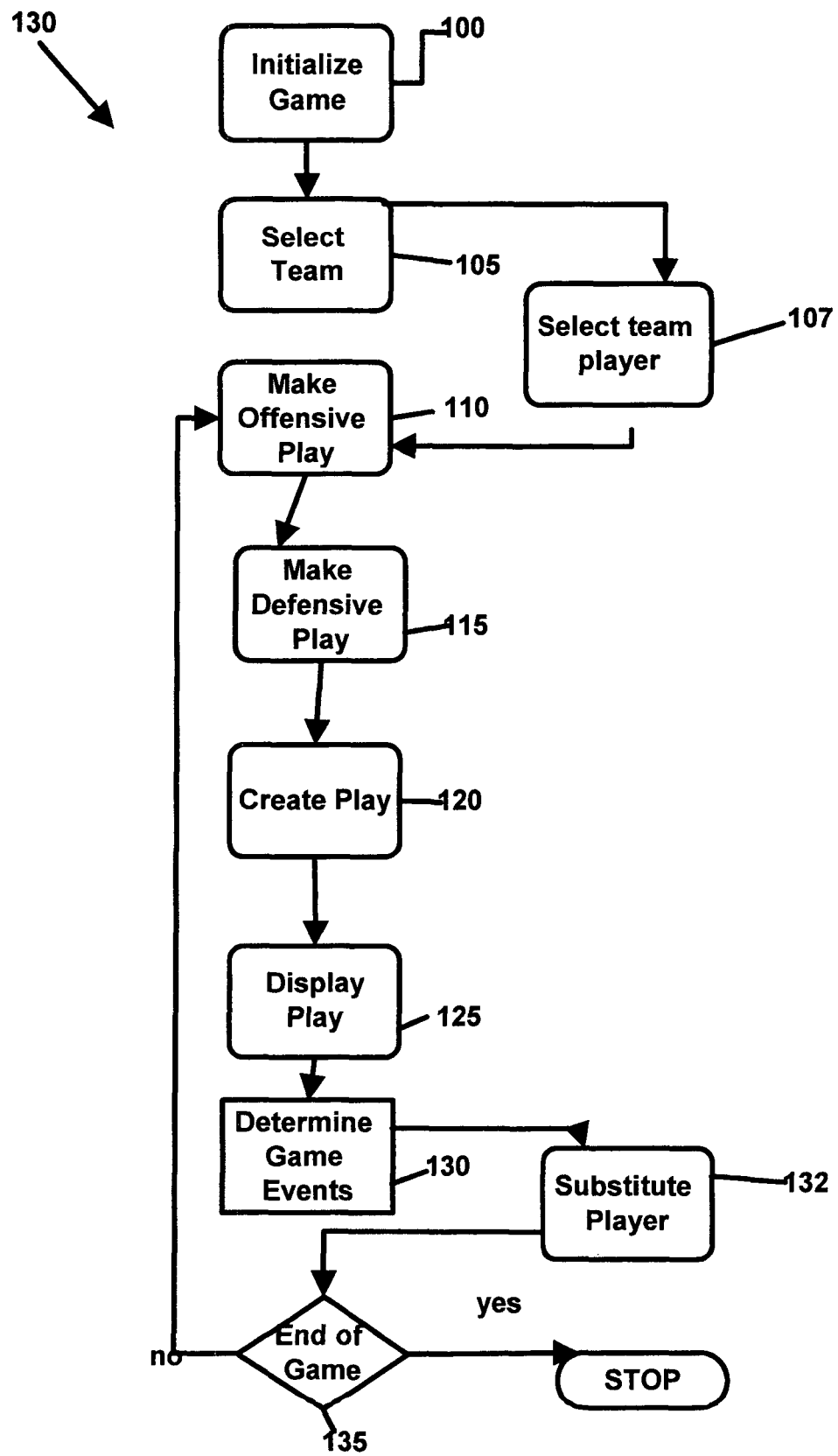
FIG. 3 illustrates a flow chart of the application software to support the present invention.
Figure 3A:
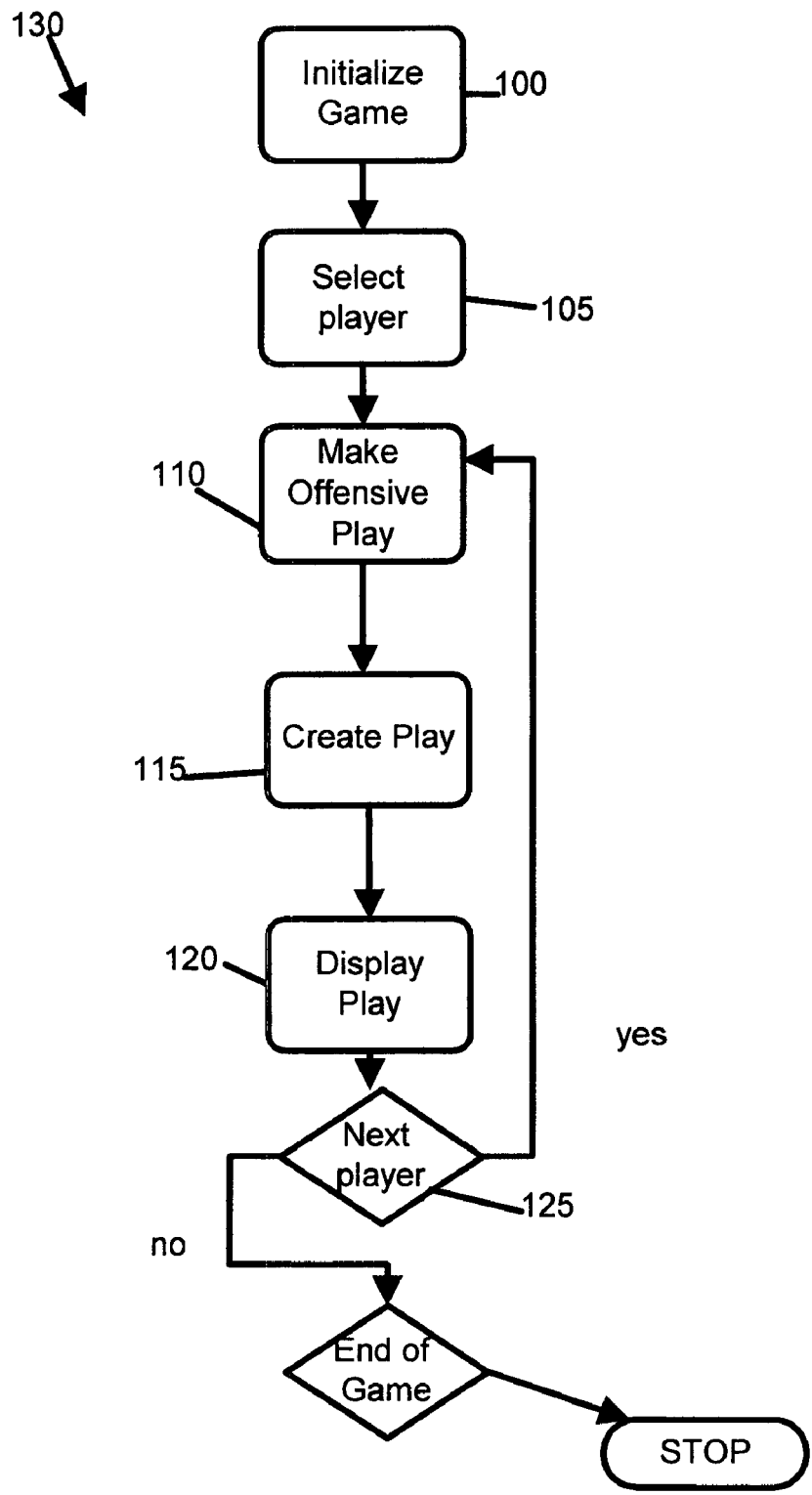
FIG. 3A illustrates application software to support the present invention for golf.

FIG. 3 illustrates the overall software structure of gaming device 5. Referring to FIGS. 1, 2, and 3 at module 100 the system initializes the game. The user inserts the external storage media into external media interface (150). The external storage media contain the specific data required to execute the game. This includes but is not limited to statistical data for each possible team and each player of each team, and visual holographic data. The statistical data for each team are read into memory means 135. The visual holographic graphics data required for the specific sports game is read into memory means (135).

Figure 4:
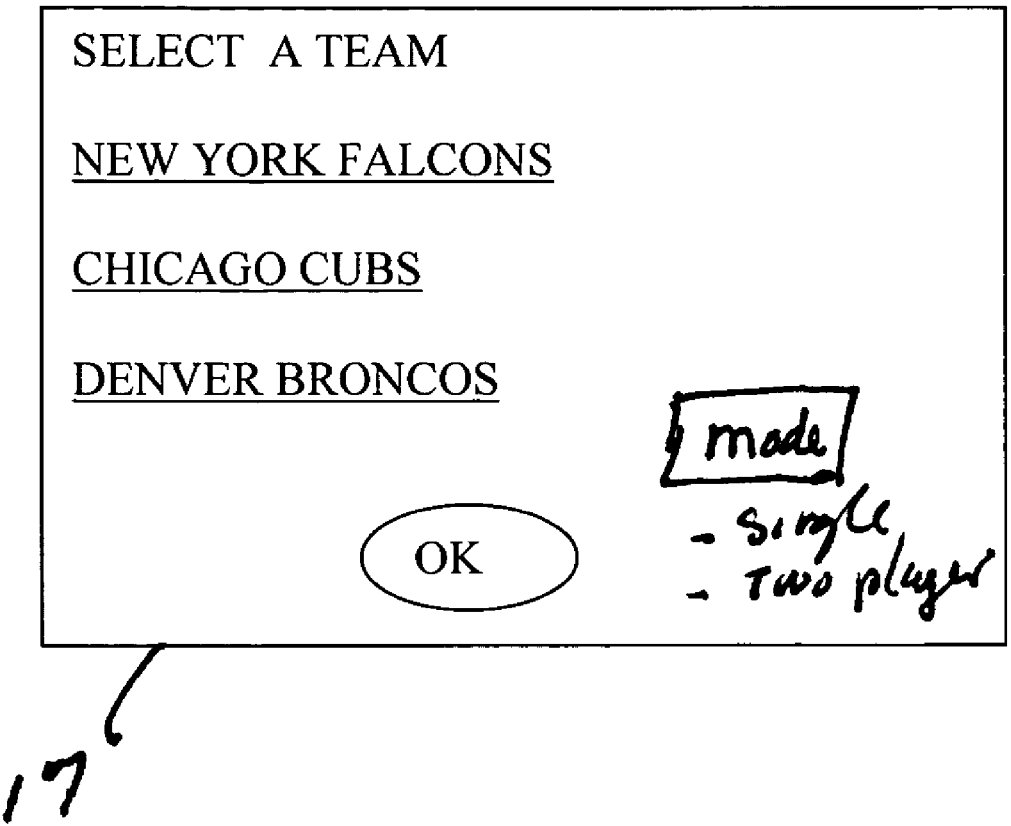
FIG. 4 illustrates an example of a team selection screen

At module 105, the system displays a selection of teams onto display means (17). FIG. 4 shows a sample illustration of the screen display. The user selects the single user mode or the two player mode. Using user interface means 25, each player selects a team. The teams can be Professional teams, college teams, or high schools. Each team is initially either assigned by the system to be offensive or defensive.

Figure 5A:
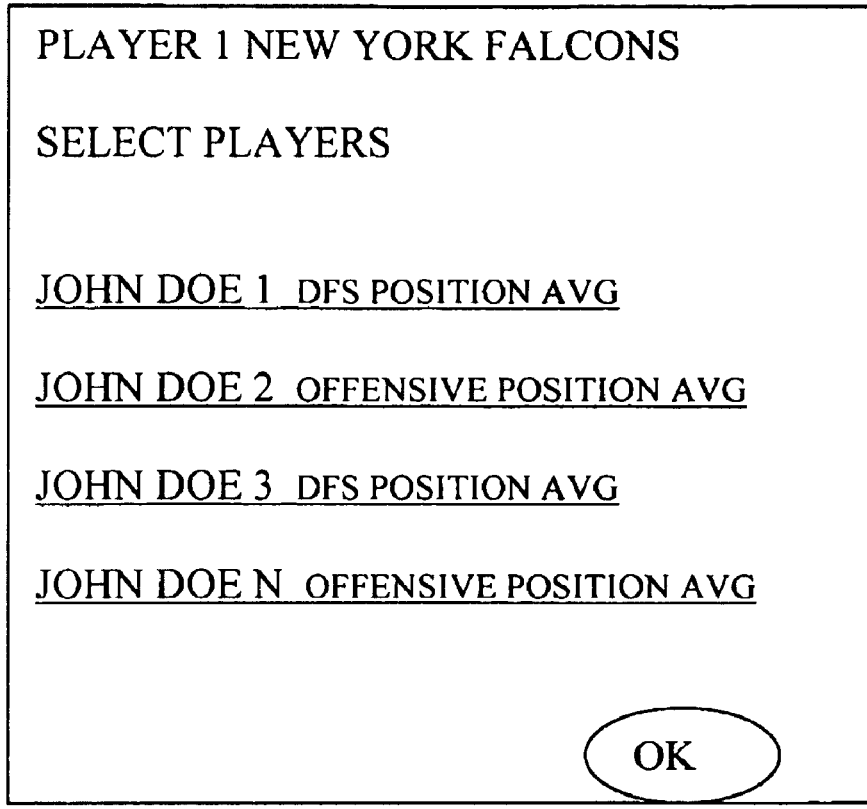
FIG. 5A illustrates an example of a player 1 selection screen for football.

At module 105 once a team is selected, each player must select the team members for the team. FIG. 5-5A, illustrate a sample displays to support baseball and football. As depicted depending upon the game each team member can be assigned a defensive and offensive statistical score. Based upon the defensive and offensive statistical score each player selects the initial team players.

At module 110 the offensive team selects an offensive play based upon the specific game. The system displays a list of possible plays upon the display means (17). Additionally, the system provides the option to view the current statistical score of the active team players. Utilizing the user interface means (25) the player selects a possible play.

At module 115 the defensive team selects a defensive play based upon the specific game. The system displays a list of possible plays upon the display means (17). Additionally, the system provides the option to view the current statistical score of the active team players. Utilizing the user interface means (25) the player selects a possible play.

At module 120 the computer creates a random play based upon the offensive team and defensive team play selections in conjunction with each active player statistical score. At module 125, then the computer selects the appropriate graphic display based upon the generated play. As shown in FIG. 7, each graphic image is stored in some location in memory means 135. The selected play is displayed onto field 10 utilizing the holographic projecting camera (20, 22). A realistic view of the play is displayed to each player of the game so that each player can adequately understand the resulting play and determine their next move.

At module 130, the system determines the next event in the game based upon the resulting play created by the computer. At module, the system allows each player to make team substitutions if desired. At module 135 if the game is over the system stops or a player can terminate the game. Other wise the system proceeds back to step 110. The system can also have a game announcing module which utilizes the sound graphics card of audio processing means (145) to announce to each player the current play and the current game status.

Implementing the game of baseball in FIGS. 1, 2 and 3, at module 100 during the initialization step the system loads the visual graphic data to support baseball into the memory means 135. At step 105 for baseball a team normally consists of 9 players. However, a team can carry up to 14-25 players. Thus, each player must select the initial active 9 players to play their game.

Figure 6:
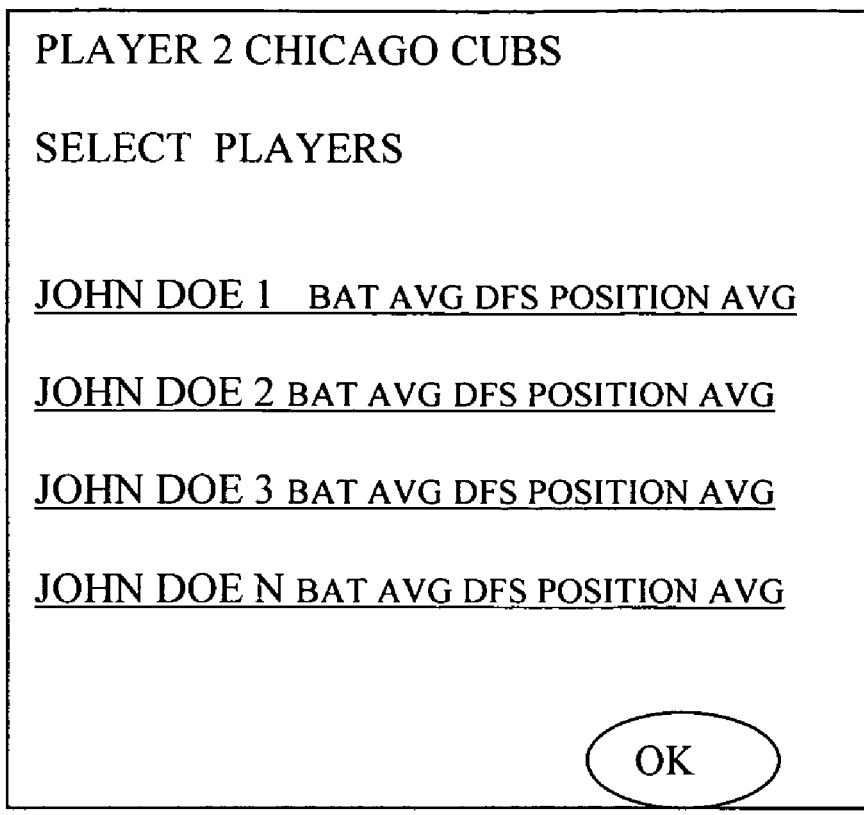
FIG. 6 illustrates an example of a player 2 selection screen for baseball.
Figure 8:
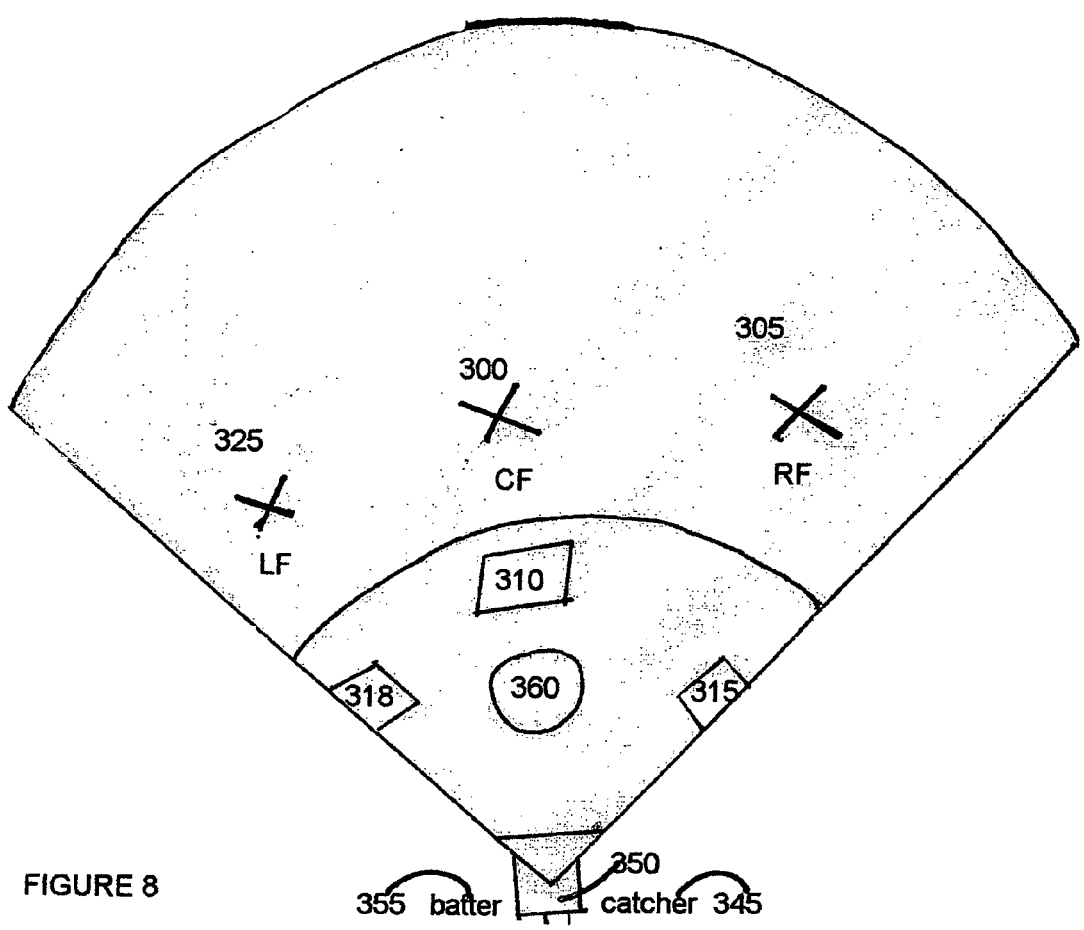
FIG. 8 illustrates a physical representation of a baseball field

FIGS. 5 and 6 illustrate sample baseball selection screens. In the illustration, each player has an offensive batting statistical score and a defensive position statistical score. As shown in FIG. 8, on the field each player is responsible for a particular defensive position. The pitcher 360 puts the play into action by throwing the ball towards the home plate 350 at the batter 355. Each throw is called a pitch. The catcher 345 receives the all from the pitcher 360 and returns it to the pitcher 360 if the batter 355 does not hit the ball. Catchers 345 defend the home plate 350 when a player is trying to score. First baseman 315, second baseman 317, and third baseman are each stationed at or near a base. The short stop 320 stands between second and third base. There are three outfielders stationed individually in right field 305, center field 300 and left field 325. Each team player position is displayed with their statistical score in their assigned position thereby allowing the player of the game to choose accurately which player they want as active.

At step 110 for baseball, the system displays a particular set of options for the player on display means 17. Possible offensive plays are hit, walk, sacrifice, error, hit and run, steal, attempt base on fly ball, and bunt. The player utilizes the user interface means (25) to choose a specific play displayed on display means 17. This module allows a user to select an offensive play based upon current situation of the game.

At step 115 for baseball, the system displays a particular set of options for the player on display means 17. Possible defensive plays are pitch, pitch out, infield playing in, outfield shit (r) and (l), hold runner on first, and pitch from the stretch. The player utilizes the user interface means (25) to choose a specific play shown on display means 17. This module allows a user to select a defensive play based upon the current situation of the game.

At step 120 for baseball, the system creates a play based upon the offensive and defensive selections along with a random number generator algorithm to select the next play. In baseball, the game centers on the action between the pitcher and the batter. Thus, at this point, the computer would place the game in action by the pitcher throwing the ball to the batter trying to be inside the strike zone which is the area directly over home plate and roughly between the batter's armpits and knees. Then, the resulting play would is created by computer based upon the statistics and the selected offensive or defensive plays. The computer selects the appropriate images which represents the generated particular play and projects the visual images onto field covering 10 which is a physical representation of the baseball field as illustrated in FIG. 8.

At step 130 the system determines the stage of a game period. In baseball, a game has total of 9 innings or game periods. Within each inning, each team plays offense and defense. At the end of the resulting generated play, the system determines whether to switch the teams between offense and defense, whether the game period is over, or whether to terminate the game.

At step 132 the system gives each player the option of substituting players. The system displays the current active players along with the non-active players onto the display means (17). At this point, a player can make substitutions if desired using the user interface means (25).

Figure 6A:
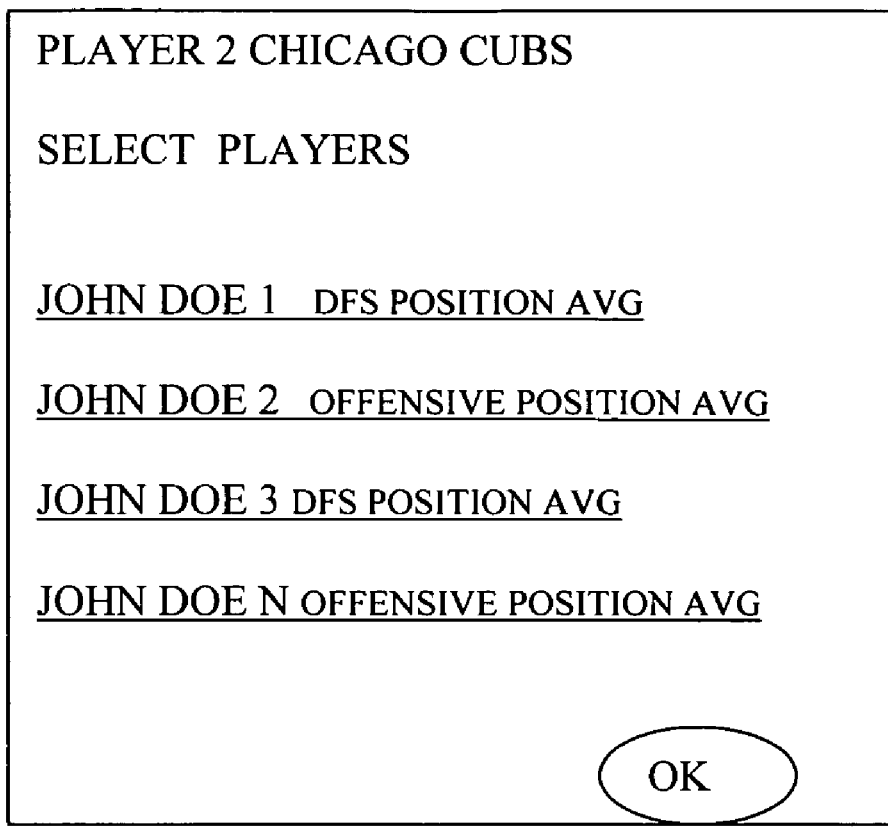
FIG. 6A illustrates an example of a player 2 selection screen for football.

Implementing FIGS. 1, 2, and 3 in the game of football, at module 100 during the initialization step the system loads the visual graphic data to support baseball into the memory means 135. At step 105 for football a team normally consists of 22 players. However, a team can carry up to 45 players. Thus, each player must select the initial active 22 players to play their game. FIGS. 5a and 6a illustrate sample football selection screens. In the illustration, each player has an offensive statistical score and a defensive position statistical score. The offensive and defensive team consists of 11 players.

Figure 9:
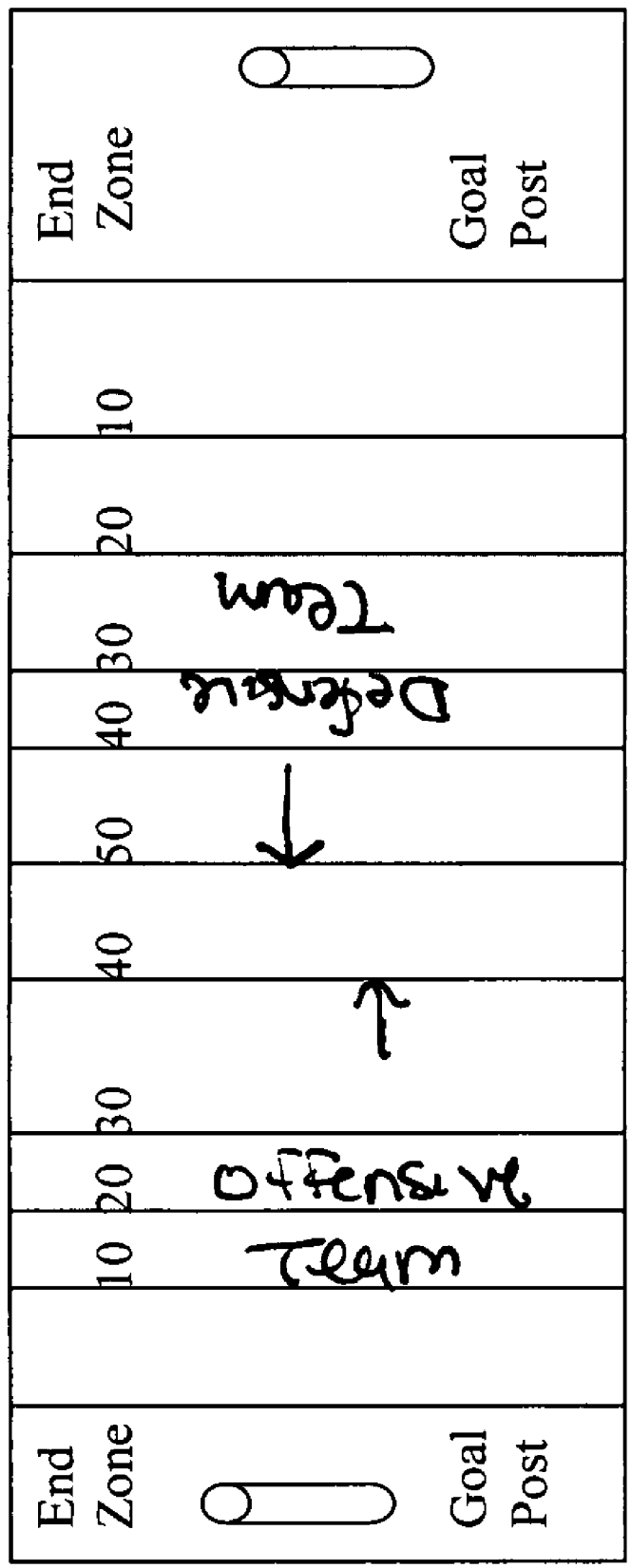
FIG. 9 illustrates a physical representation of a football field

FIG. 9 is an illustration of a sample football field. Each team would face their corresponding goal post in play on the field. There are seven linemen, who play on the line of scrimmage and four backfield players who stand behind the seven linemen. The lineman who is positioned in the middle of the line is called the center. On his left is the left guard and the center right is the right guard. The center begins each play by hiking the ball or passing the ball to the quarter back. A far the ball is hiked on a running play the center guards and tackles block definers to create an open path for the ball carrier. On passing plays the line man protects the quarter back and gives his time to throw. Tight ends and spilt ends can block opponents, but they may also catch the ball during a passing play.

The defensive team works together to stop the offensive team from scoring. The team consists of a row of lineman, a row of linebackers, and collection of secondaries. The linemen position themselves at the line of scrimmage. The linebackers position themselves behind the defensive line. The secondaries stand at the end of the defensive line and behind the linebackers. Depending upon the situation linebackers stop runners, pressure the quarterback, or cover the opposition's receivers. The linemen are principally responsible for stopping the opposition's rushing attach and in some situations pressuring the quarterback. The offensive team and the defensive team each have special team for special plays. These special plays are kickoff, field goals, punts and returns.

At step 110 for football, the system displays a list of possible offensive moves for the player on display means 17. Possible offensive plays are run, plunge, shot pass, long pass, time clock, penalties, injuries, and specialty plays. The player utilizes the user interface means (25) to choose a specific offensive play. This module allows a user to select an offensive play based upon current situation of the game.

At step 115 for football, the system displays a list of possible defensive moves for the player on display means 17. Possible defensive plays can be line set of 5, 6, 7, or 8 man line defenses. The player utilizes the user interface means (25) to choose a specific defensive play. This module allows a user to select a defensive play based upon current situation of the game.

At step 120, the computer generates a play. The object of the game is for each team to try to score by moving the ball into the end zone of the opposing player. The game is put into play by the quarterback of the offensive team. The resulting play is displayed onto field covering 10 which is a physical representation of the football field as illustrated in FIG. 9.

At step 130 the system determines if at end of a game period. In football, a game has total of four 10-15 minute quarters or game periods. Within each quarter, each team plays offense and defense based upon the result of the previous play. A team switches to defense after making a touchdown, field goal, or failing to move the ball 10 yards within four plays. At step 130 the system determines if the teams need to switch between offense and defense based upon the generated computer play. If at the end of a quarter the computer proceeds to step 135 to determine if at the end of the game.

At step 132 the system gives each player the option of substituting players. The system displays the current active players along with the non-active players onto the display means (17). The user makes the selection using the user interface means (25).

Golf is not traditionally played with teams, but is based upon the individual skill of the player. The game can be played with one or more players.

Implementing the game of golf in FIG. 1, 2, 3A, at module 132, the system displays a list of players onto the display means 17. FIG. 4A illustrates a sample player selection screen for the game of golf. Utilizing user interface means (25) the player selects a player to represent them in the game.

At module 105 each player makes selects a play based upon the specific statistics of the player. Then at module 110, the system displays a list of possible plays upon the display means (17) in conjunction with the statistics of the player. The possible plays can be the list of clubs in conjunction with the type of swing to use with that particular club. Utilizing the user interface means (25) the select a possible swing of the ball.

At module 115 the computer creates a random play based upon the statistics of each player and the selected play and displays onto the field 10 which represents a golf course. The resulting play is player hitting the ball onto the golf course. Golf is game in which individual players use specially designed clubs to propel a small, hard ball over a field of play known as a course. The object of the game is to advance the ball around the course using as few strokes as possible.

A golf course is divided into 18 sections, called holes. The standard course is about 6,500 to 7,000 yd. The individual holes may vary in length from 100 to 600 yd. Each hole has at one end a starting point known as a tee and, imbedded in the ground at the other end and marked by a flag, a cup or cylindrical container (also called a hole). The ball is propelled from the tee into the hole. The cup is usually made of metal or plastic, 4.25 in diameter, and at least 4 in deep. With this game the number of holes can be predetermined by the players.

Figure 10:
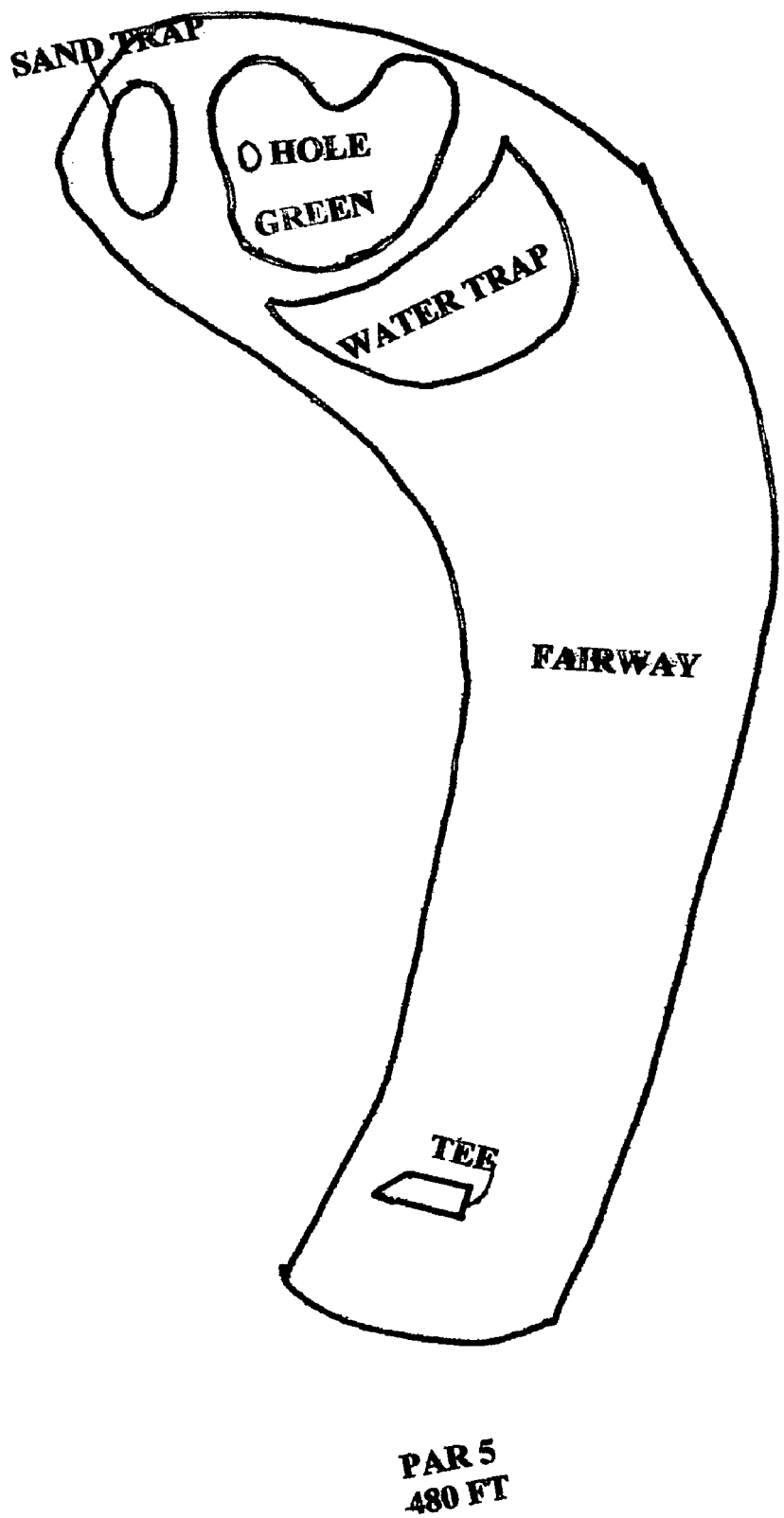
FIG. 10 illustrates a sample configuration of one hole on a golf course.
Figure 10A:
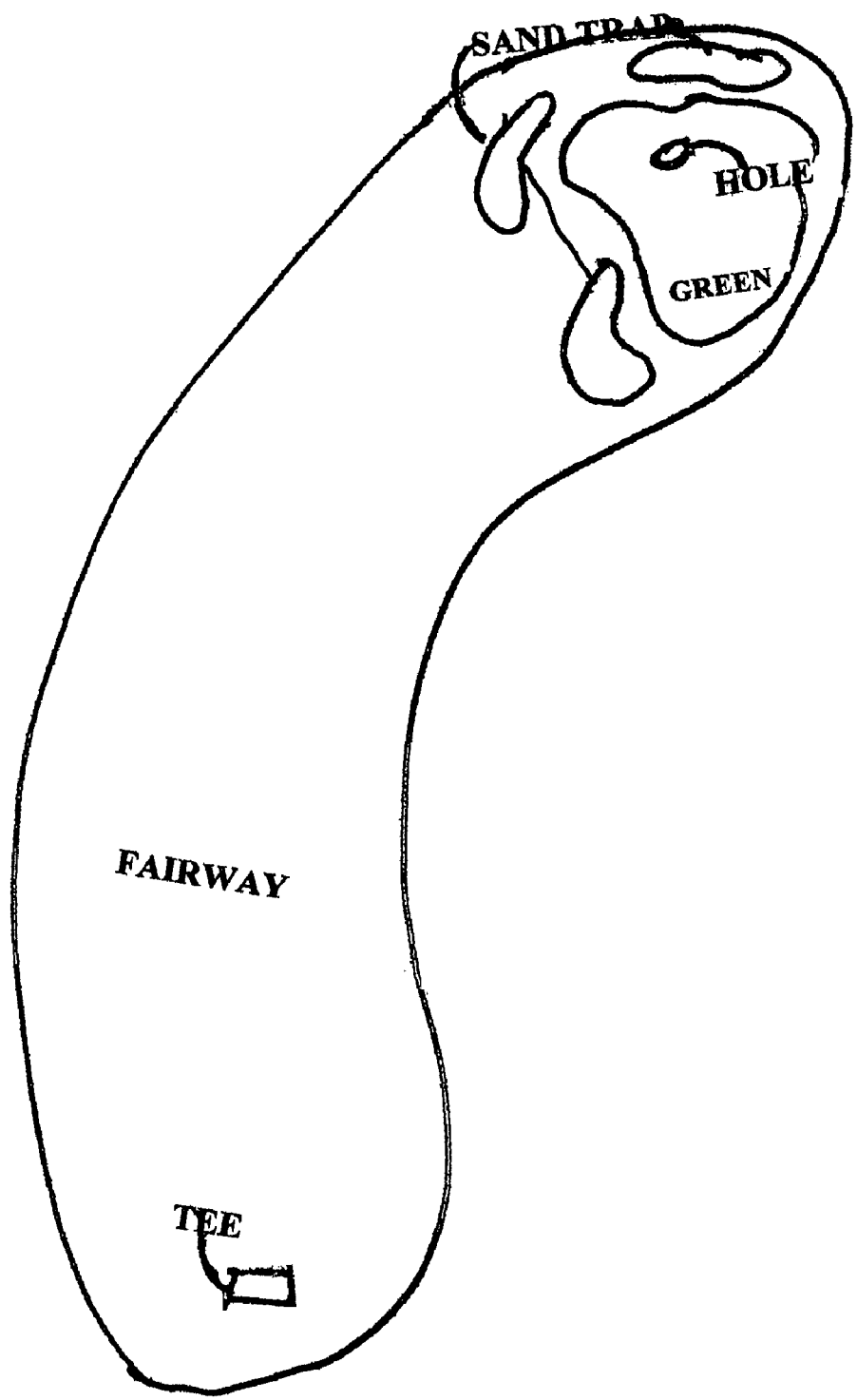
FIG. 10A illustrates an alternative sample configuration of one hole on a golf course.

A player begins at the first tee, a level area of turf generally raised slightly above the surrounding terrain. From here each player tries to drive the ball onto the fairway, or main part of the golf course, a carefully tended strip of land, 30 to 100 yd wide, on which the grass has been cut low to provide a good playing surface for the ball. On either side of the fairway is the rough, which consists of areas, covered with long grass, bushes, or trees, and which sometimes contains sandy, rough, or marshy areas that force golfers to use additional skill and judgment in playing their shots. In the absence of such natural obstacles, artificial hazards may be constructed. These include bunkers, also known as traps, which are hollows dug in the earth and usually filled with loose sand; mounds and other earthen embankments; and water hazards, such as ditches, creeks, ponds, or lakes. At the far end of the fairway from the tee is the putting green, an area of closely cropped grass surrounding the hole or cup. The smooth surface of the putting green is designed to provide a consistent path after the ball has been given a tap or gentle stroke known as a putt. Field covering 10 is created to physically represent the areas of the golf course described above. In golf each hole requires a different physical field configuration as shown in FIGS. 10 and 10A.

The game of golf can be played with more than one player. Thus, for each player module 110 through 125 is repeated. The game is played until all 18 holes are made by each player or until the game is aborted by the players. At the completion of each hole the players are prompted to change the next hole configuration before preceding. The game can provide the option of one player terminated playing the game while the rest of the players proceed. However, the other players can continue playing.

What is claim is:

1. A method for a game device controller computer system for a desired sports game, the method comprising: (a) providing a game console housing containing a game field operationally connected to a computer system having a processor means operationally coupled to an user interface means, a scoreboard, a display means, at least one holographic projecting cameras, external storage, and a computer memory means; (b) physically incorporating onto the game field an actual miniature physical replica of the field of the desired sports game that is removable; (c) inputting into the memory means characteristic statistical data for each team in a list of teams and realistic visual image data; (d) for a first manager, selecting a first team with a group of active players from the list of teams; (e) for a second manager, selecting a second team with a group of active players from the list of teams; (f) assigning an offensive play between the first team and the second team; (g) assigning a defensive play between the first team and the second team; (h) accepting input commands through the user interface means from the first manager to setup a play for the first team; (i) create a holographic display based upon visual image data stored in the computer memory means; (j) initiate a holographic projecting camera; (k) transfer the holographic display to the holographic projecting camera; (l) accepting input commands through the user interface means from the second manager to setup a play for the second team; (m) creating a random play based upon the characteristic statistical data for the first group and the second group of active players in conjunction with the first manager and the second manager input commands; (n) displaying onto the game field with the at least one holographic projecting-camera a three-dimensional realistic dynamic holographic image that represents the random results of the first team and the second team from the input commands of the first manager and the second manager plays; (o) determining the next game event; and (p) repeating steps h through I while until the game is ended.

2. The method of claim 1 further comprising representing the game field as physical replica of a baseball field.

3. The method of claim 1 further comprising representing the game field as a physical replica of a football field.

4. The method of claim 1 further comprising representing the game field as a physical replica of a golf course.

5. The method of claim 2 wherein the determining the next game event further comprises determining whether the next game event is the end of an inning.

6. The method of claim 3 wherein the determining the next game event further comprises determining whether the next game event is the end of a quarter.

7. The method of claim 4 wherein the determining the next game event further comprises determining whether the next game event is the end of a hole.

8. The method of claim 5 wherein the determining of the next event further comprises switching the offensive player and the defensive player of the game.

9. The method of claim 1 further comprising generating a data structure containing a plurality of visual image data representing each possible play in the desired sports game from external storage means.

10. The method of claim 9 further comprising inputting into the memory means a subset of the plurality of visual image data that represent the random play.

11. The method of claim 1 further comprising inputting into the memory means statistics for each player on the first team and the second team.

12. The method of claim 1 further comprising: generating a current characteristic statistical data for each active player based upon the random play; and storing the current statistical data into the memory means.

13. The method of claim 10 further comprising generating from the subset of the visual image data a holographic image.

14. The method of claim 1 further comprising displaying onto the scoreboard the score of the first team and the second team.

15. The method of claim 1 further comprising displaying onto the display means the current statistical data of each active player of the first team and the second team.

16. The method of claim 1 further comprising an announcing to the first team manager and the second team manager the current status of the game after the random play.

17. A game device controller computer system for a desired sports game, the system comprising: a game console housing containing a processor means operationally coupled to an user interface means, a scoreboard, a display means, at least one holographic projecting camera, and a memory means; a game field incorporating a physical replica of the field of the desired sports game, the game field coupled to the housing; the processor means programmed to: (a) input into the memory means characteristic statistical data for each team in a list of teams; (b) for a first manager, select a first team with a group of active players from the list of teams; (c) for a second manager, select a second team with a group of active players from the list of teams; (d) assign an offensive play between the first team and the second team; (e) assign a defensive play between the first team and the second team; (f) accept input commands through the user interface means from the first manager; (g) accept input commands through the user interface means from the second manager; (h) create a random play based upon the characteristic statistical data for the first group of active players in conjunction with the characteristic statistical data second group of active players in conjunction with the first manager and second manager input commands; (i) select a holographic display based upon the random display; (j) initiate a holographic projecting camera; (k) transfer the holographic display to the holographic projecting camera; (l) display onto the game field with the holographic projecting camera a three-dimensional realistic holographic image that represents the random results of the first team and the second team from the input commands of the first manager and the second manager (m) determine the next game event; and (n) repeat steps f through m while until the game is ended.

18. The game device controller of claim 17 wherein the housing further comprises: a display component, a controller component, and a user interface component; the display component for housing the display means and the scoreboard means; the controller for housing a processor means, memory means, external interface means; a field component for supporting the game field; the controller in communication with the field component, the display component, and the user interface component.

19. The game device of claim 17 wherein the user interface component is integrated with the controller component.

20. The game device of claim 17 wherein the controller component further comprises an external interface means for accepting the input.

21. The game device of claim 17 wherein the game field is a physical replica of a baseball field.

22. The game device of claim 17 wherein the game field is a physical replica of a football field.

23. The game device of claim 17 wherein the game field is a physical replica of a golf course.

24. The game device of claim 21 wherein the processor means is further programmed to determine the next game event further comprises determining whether the next game event is the end of an inning.

25. The game device of claim 22 wherein the processor means is further programmed to determine whether the next game event is the end of a quarter.

26. The game device of claim 23 wherein the processor means is further programmed to determine whether the next game event is the end of a hole.

27. The game device of claim 17 wherein the processor means is further programmed to determine of the next event further comprises switching the offensive player and the defensive player of the game.

28. The game device of claim 17 wherein the processor means is further programmed to generate a data structure containing a plurality of visual image data representing each possible play in the desired sports game from external storage means.

29. The game device of claim 28 wherein the processor means is further programmed to input into the memory means a subset of the plurality of visual image data that represent the random play.

30. The game device of claim 17 wherein the processor means is further programmed to input into the memory means statistics for each player on the first team and the second team.

31. The game device of claim 17 wherein the processor means is further programmed to: generate a current characteristic statistical data for each active player based upon the random play; and store the current statistical data into the memory means.

32. The game device of claim 28 wherein the processor means is further programmed to generate from the subset of the visual image data a holographic image.

33. The game device of claim 17 wherein the processor means is further programmed to display onto the display means the current statistical data of each active player of the first team and the second team.

34. The game device of claim 21 wherein the processor means is further programmed to announce to the first team manager and the second team manager the current status of the game after the random play.

35. A computer readable medium having the following method for a sport game device controller embodied therein, the controller includes a game console housing containing a game field physically incorporating a replica of the game and operationally connected to a computer system having a processor means operationally coupled to an user interface means, a scoreboard, a display means, a holographic projecting means, and a memory means; (a) physically incorporating onto the game field a replica of the field of the desired sports game; (b) inputting into the memory means a list of teams and visual image data for the desired sports game; (c) for a first player, selecting a first team with a group of active player from the list of teams; (d) for a second player, selecting a second team with a group of active player from the list of teams; (e) assigning an offensive player between the first team and the second team; (f) assigning a defensive player between the first team and the second team; (g) accepting input commands through the user interface means from the offensive player; (h) accepting input commands through the user interface means from the defensive player; (i) in response to offensive player in conjunction with the defensive player input commands, creating a random play; (j) displaying onto the game field with the holographic projecting means a three-dimensional holographic image that represents the random play; (k) determining the next game event; and (l) repeating steps g through l while until end of game is terminated.

* * * * *